United States Patent [19]

Reback

[11] Patent Number: 4,739,788
[45] Date of Patent: Apr. 26, 1988

[54] FAUCET REPAIR KIT

[76] Inventor: Richard L. Reback, 5649 Sorrento Dr., Long Beach, Calif. 90803

[21] Appl. No.: 29,137

[22] Filed: Mar. 23, 1987

Related U.S. Application Data

[63] Continuation-in-part of Ser. No. 939,037, Dec. 8, 1986, abandoned.

[51] Int. Cl.⁴ .................................................. F16L 55/18
[52] U.S. Cl. ........................................ 137/15; 137/315; 137/359; 137/360; 4/192
[58] Field of Search ................ 137/359, 360, 15, 315; 4/191, 192

[56] References Cited

U.S. PATENT DOCUMENTS

| | | | |
|---|---|---|---|
| 1,281,335 | 10/1918 | Fraser | 137/360 |
| 3,331,386 | 7/1967 | Politz | 137/359 |
| 4,240,462 | 12/1980 | Bonkstahl | 137/377 |

FOREIGN PATENT DOCUMENTS 248057  8/1961  Australia ............................. 137/360

Primary Examiner—A. Michael Chambers
Attorney, Agent, or Firm—Fulwider, Patton, Rieber, Lee & Utecht

[57] ABSTRACT

A faucet repair kit for replacing a faulty valve stem, handle and escutcheon. The kit includes an adapter ring for fitting over the replacement valve stem and including an adhesively backed ring for mounting directly on the tile work surrounding the stem to hold the adapter ring in position. The adapter ring is formed with external threads which engage with the internal threads of an escutcheon formed to fit over the valve stem and screw onto the adapter ring. The escutcheon may have a detachable neck to permit the length thereof to be adjusted. A valve handle with a detachable skirt is then provided for fitting upon the valve stem such that the skirt may be detached to selectively adjust the length of the valve handle in accordance with the relative lengths of the replacement stem and escutcheon.

15 Claims, 2 Drawing Sheets

FAUCET REPAIR KIT

BACKGROUND OF THE INVENTION

This application is a continuation-in-part of U.S. patent application Ser. No. 06/939,037 filed Dec. 8, 1986, now abandoned.

FIELD OF THE INVENTION

The present invention relates to a kit which may be employed for installing a universal faucet escutcheon.

DESCRIPTION OF THE PRIOR ART

There has long existed a problem in the plumbing industry with the replacement of faulty valve stems which project through an opening in a room will to be shrouded by an escutcheon. Typically, a handle mounts from the end of the valve stem.

The long standing problem is that replacement valve stems may be of lengths and/or diameters different from the original stem thus necessitating replacement of the escutcheon. This is frequently no easy task since supply stores cannot realistically stock escutcheons to accommodate all combinations of stem sizes. The difficulty is compounded by the fact that escutcheons typically screw directly onto a valve nipple surrounding the stem thus placing a further restriction on the configuration of escutcheon which may be employed. Efforts have been made to design escutcheon and handle installation assemblies which will accommodate valve stems projecting through walls having various different thicknesses. Typically, these assemblies incorporate a valve bonnet having a threaded nipple projecting therefrom. Typically these efforts have led to the design of escutcheons which are formed with an enlarged base for abutting against the wall and a reduced-in-diameter barrel projecting therefrom to telescope concentrically over the nipple. The barrel is formed on its open end with internal threads which threadably engage the threads of the nipple for screwing inwardly and outwardly relative thereto.

Such devices, while being satisfactory for their intended uses, suffer the shortcoming that threaded engagement must be made with the valve nipple thus requiring that the screw threads in the escutcheon be configured to mate with the threads of the nipple. This necessitates forming the valve body with the projecting threaded nipple and restricts application to only those valves so formed. While satisfactory for initial installation, such devices have proven unsatisfactory for replacement handles. This is because there exists millions of faucet installations throughout the country incorporating faucets manufactured by numerous different manufacturers, each having their own pecularities, including diameter of valve nipples. Many of such previously existing valve nipples do not even project from the plumbing and through the wall a distance sufficient to enable the internal threads of an escutcheon to be engaged therewith.

Other efforts have led to the provision of a concentric sleeve for telescopical receipt in concentric relationship about the valve bonnet and within the barrel of the escutcheon. The escutcheon itself incorporates an axially extending set screw which may be tightened against the sleeve to secure the escutcheon relative to the sleeve. Again, such arrangements limit use in stem repair and escutcheon replacement since it contemplates use of a sleeve which would fit only a limited style of previously installed valves. Devices of the general nature described are shown in U.S. Pat. Nos. 2,896,222, 2,966,924, 3,043,330, 3,067,436 and 3,376,888.

Consequently, there exists a need for a faucet repair kit which will allow for new valve stems having a wide range of configurations to be employed in replacing faulty stems and enable such new valve stems to be shrouded by escutcheons of a univeral configuration.

It is contemplated that this faucet repair kit be economical to manufacture and convenient to install by even the most inexperienced do-it-yourselfer.

SUMMARY OF THE INVENTION

The present invention is characterized by an escutcheon incorporating a flared out base formed with a longitudinal peripheral wall having screw threads on the interior thereof. An adhesive mounting ring is mounted on one side of an adapter ring for affixing it to a tile wall and the exterior of such adapter ring is formed with screw threads for mating with the screw threads in the base of the escutcheon. The adapter and attachment rings may be formed with through openings spaced thereabout for insertion of a flowable bonding agent to further assist in bonding the ring to such wall.

Other objects and features of the invention will become apparent from consideration of the following description taken in connection with the accompanying drawings.

DESCRIPTION OF THE PREFERRED EMBODIMENT

Figure 1:
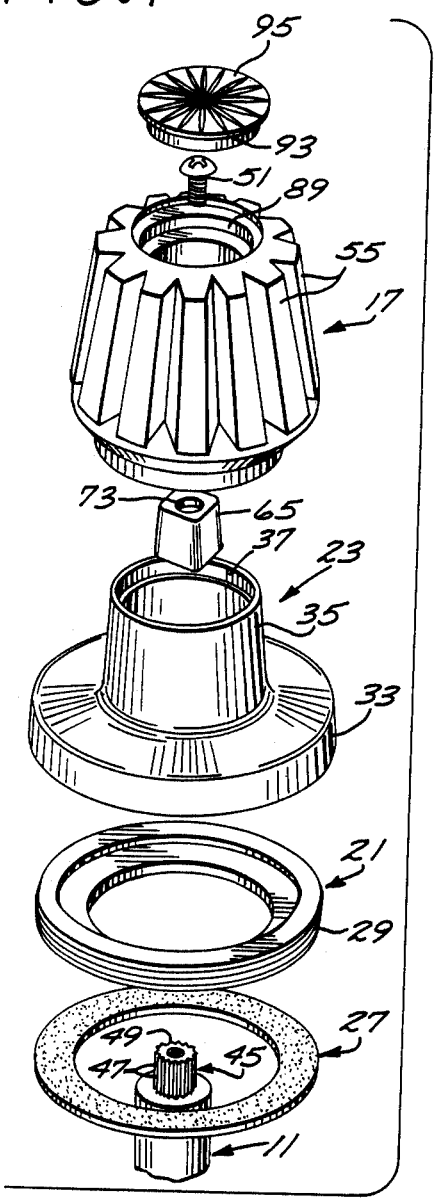
FIG. 1 is an exploded perspective view of a faucet repair kit embodying the present invention.
Figure 2:
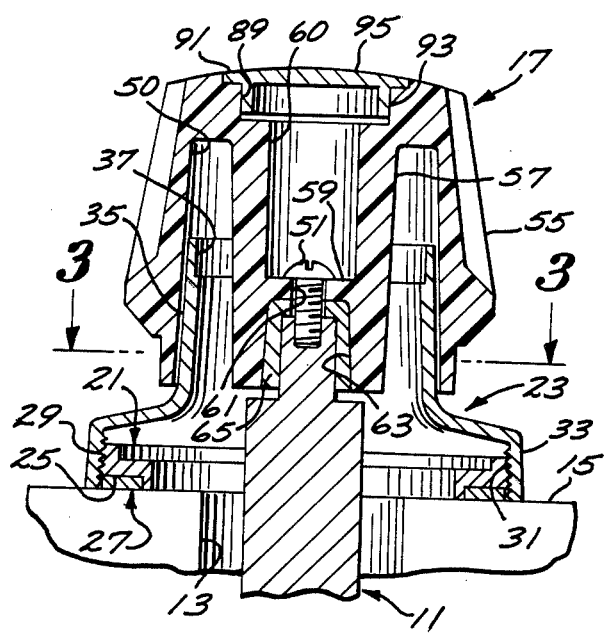
FIG. 2 is a longitudinal partial sectional view, in enlarged scale, of the faucet repair kit shown in FIG. 1.

Referring to FIGS. 1 and 2, the faucet repair kit of the present invention includes, generally, a valve stem 11 projecting from the body of a faucet valve (not shown), through an opening 13 in a wall 15 for mounting on the end thereof a cylindrical valve hand 17. Received concentrically about the stem 11 and mounted to the wall 15 is an adapter ring, generally designated 21. The ring 21 is externally threaded and has screwed thereonto an internally threaded escutcheon, generally designated 23.

It has long been the plague of do-it-yourselfers desiring to stop a dripping faucet that valve stems readily available from the local hardware stores are typically of configurations different in length and diameter from that of the faulty stem. Consequently, for older valves, replacement valve stems which accommodate existing escutcheons and handles are frequently not available. Even when available, the task of replacing the valve stem, surrounding escutcheon and handle typically involves numerous trips to various hardware and plumbing stores endeavoring to locate a valve stem which will fit the valve being repaired and to then locate an escutcheon which will accommodate that particular valve stem. For older plumbing, the problem is magnified by the fact that the manufacturer of the original valve stem has frequently gone out of business. Thus, he must either have a valve stem manufactured or install a new valve stem which may be a length substantially different from that of the stem being replaced.

Since the particular configuration of valve stem and escutcheon necessary for installation and for accommodating numerous different configurations involves restrictions, both as to length and diameter of the valve stem, it is desirable to provide a valve stem and escutcheon arrangement which will accommodatae the entire limits anticipated for both length and diameter.

To achieve the objections of this invention, I fabricated an adapter ring 21 which may be constructed of, for instance, stainless steel or plastic. I configured the adapter ring with an inside diameter of about two inches which I have found to accommodate all known configurations of domestic valve stems. I have determined that the wall openings 13 for the valve stems 11 typically have a diameter of less than one inch thus leaving the face of the wall 15 surrounding such opening available for mounting of the adapter ring 21 thereon. The adapter ring itself is formed on its backside with a gland 25 for receiving a flat mounting washer or ring, generally designated 27. The mounting ring 27 is cut from double sided bonding tape available from Wilshire Foam Causch of Los Angeles, California under the designation MT8. Such ring is received within the gland 25 to bond to the interior surface thereof with the exposed face intended to be bonded directly to the facing surface of the wall 15. The ring 21 is formed exteriorly with threads 29 which threadably receive interior threads 31 formed in the base 33 of the escutcheon 23.

The escutcheon itself may be constructed of brass or any desirable material and is typically formed with the enlarged in diameter base 23 which tapers radially inwardly and projects axially therefrom to form a barrel 35. The free end of the barrel 35 is formed with an elongated interior gland 37. An escutcheon extension, generally designated 41, in the form of a cylindrical tube defining a neck is formed on one end with a reduced in diameter nipple 43 which is configured to friction fit into the escutcheon gland 37.

The base 33 of the escutcheon 17 flares outwardly from the barrel 35 and is cup shaped with the threads 31 formed on the interior of the peripheral wall thereof.

A replacement valve stem 11 is typically formed at its free extremity with a reduced in diameter nib, generally designated 45, which is formed exteriorly with serrations 47. The nib is formed with an open ended threaded bore 49 for receipt of a fastening screw 51 which fastens the handle 17 in position.

The handle 17 is typically formed by a cylindrical wall 50 having a decorative design about the periphery thereof formed by longitudinal ribs 55 which form a convenient hand grasp handle surface. The handle 17 is formed interiorly with a central boss 57 (FIG. 2) which projects concentrically therein to form a cylindrical socket 60 having an end wall 59 in which a bore 61 is formed for receipt of the fastening screw 51.

The boss is formed on the opposite side of the end wall 59 with a generally square in cross-section socket 63. Received in press fit relationship within the socket 63 is a generally square in exterior cross-section plastic spud 65. The spud 65 is formed interiorly with a serrated bore 71 (FIG. 3) which complementally fits over the serrated nib 45. The spud 65 is formed in its closed end with a through bore 73 (FIG. 1) for receipt of the mounting screw 51. By packaging about 12–16 spuds 65 in my repair kit, each having six different diameters of serrated bores, I can accommodate substantially all valve stems currently on the market.

Figure 3:
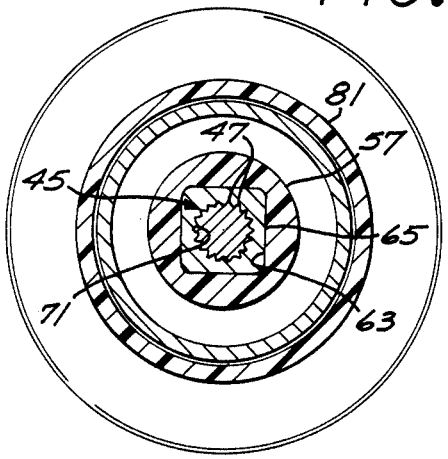
FIG. 3 is a transverse sectional view taken along the line 3—3 of FIG. 2.

Referring to FIGS. 1 and 3, the peripheral wall 50 of the handle 17 is formed at its open end with a cylindrical handle barrel 81 (FIG. 3). A tube shaped handle skirt, generally designated 83 (FIG. 4) is formed on one end with an elongated interior gland 85 which is formed to fit over the barrel 81 and form a friction fit therewith.

Referrring to FIG. 2, the handle 17 is formed in its opposite end with a conventional open ended bore defining a socket 89 which is enlarged in cross-section at 91 to form a cylindrical recess for removable receipt of the shank 93 of a cap 95 which closes the socket 60 and covers the head of the mounting screw 51.

In operation, a replacement kit is typically packaged with an escutcheon 23, extension 41, handle 17, handle screw 83, mounting ring 27 and a set of, for instance 16, spuds 65 having interior serrated bores 71 of respective different diameters to correspond with the configuration of the different nibs 45 incorporated in the various valve stems 11 currently on the market. Thus, the repairman will select a valve stem 11 which will fit the particular faucet valve being repaired. From that point on, the kit incorporating the aforementioned components will serve to enable stem and escutcheon replacement by even the most unskilled home owner.

In this regard, the existing escutcheon may be unscrewed from the valve bonnet (not shown) and discarded, thus leaving the opening 13 in the wall 15. The new valve stem 11 is then installed to replace the faulty valve stem thus leaving the nib 45 exposed. The surface of the tile may be cleaned and prepared, as by sanding to form a roughened surface having good bonding characteristics. The mounting ring 27 may then be fitted over the projecting valve stem 11 and pressed firmly to the wall 15 as shown in FIG. 2. The escutcheon 17 may then be fitted over the end of the stem 11 and screwed onto the adapter ring 21. Care must be taken to screw the escutcheon 17 onto such ring to only a finger tight condition to thus avoid overtightening which would serve to drive the peripheral wall of the base 33 against the surface of the tile facing the wall 15 to lift the mounting ring 27 therefrom.

For a valve stem 11 in a valve configuration which causes such stem to project a relatively short distance from the face of the wall 15, the valve skirt 83 and extension 41 may be removed and discarded. A spud 65 is selected from the set of spuds and pressed into the spud socket 63 of the valve 17. The remaining spuds may then be discarded. It will be appreciated that mass production of the spuds 65, skirt 83 and extension 41 enables those components to be included in the kit at relatively little cost, thus having them available for all applications and allowing for disposal in applications where not needed without adversely affecting the overall cost of the entire kit.

The escutcheon 23 may then be threadably screwed onto the adapter ring 21 as shown in FIG. 2 to thus shroud the stem 11. The valve handle 17 may then be positioned over the stem with the nib 45 received in the spud 65 and the mounting screw 51 inserted. The cap 95 may then be installed to cover such mounting screw 51 for aesthetic purposes. The valve handle is then ready for use. As the stem is screwed out relative to the wall 15 thus shifting the handle 17 axially outwardly relative to the escutcheon barrel 35 as viewed in FIG. 2, such barrel will serve to maintain the valve stem 11 shrouded from view thus enhancing the aesthetic appearance of the installation.

Figure 4:
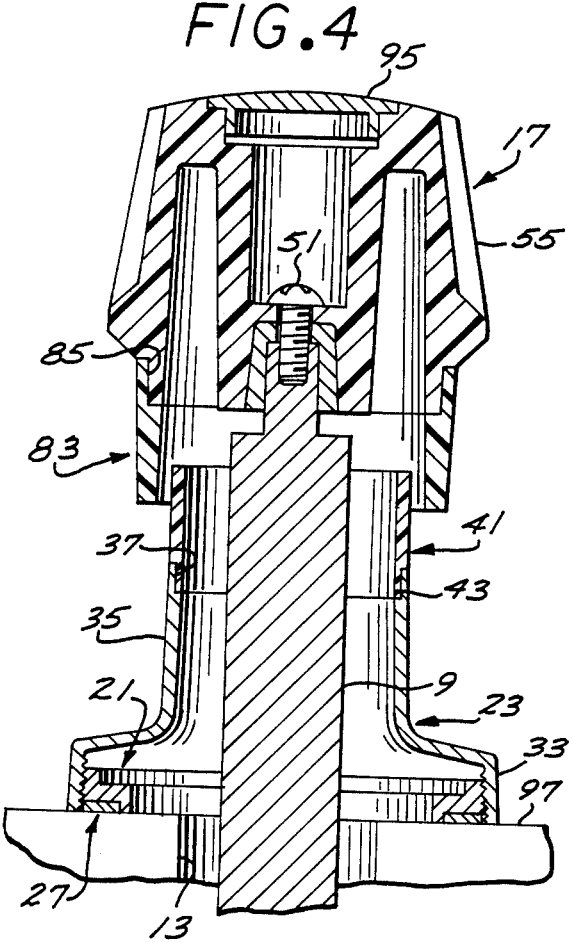
FIG. 4 is a longitudinal sectional view similar to FIG. 2 but of a second embodiment of the valve repair kit of the present invention.
Figure 5:
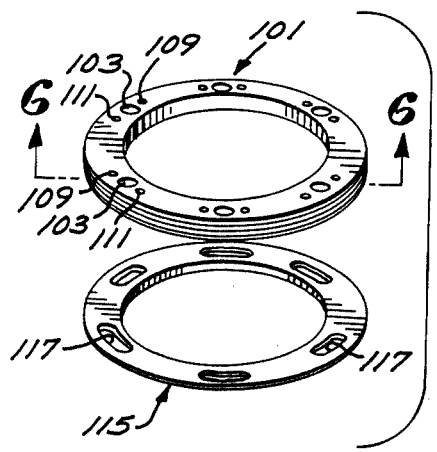
FIG. 5 is a perspective view of adapter and attachment rings incorporated in a third embodiment of the faucet repair kit of the present invention.
Figure 6:
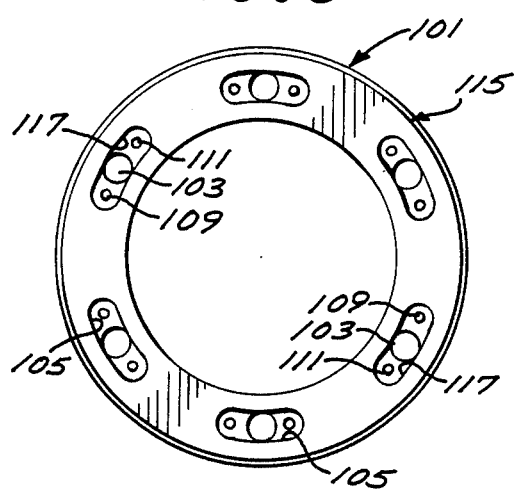
FIG. 6 is a back view, in enlarged scale, of the adapter ring shown in FIG. 5, taken along the line 6—6.
Figure 7:
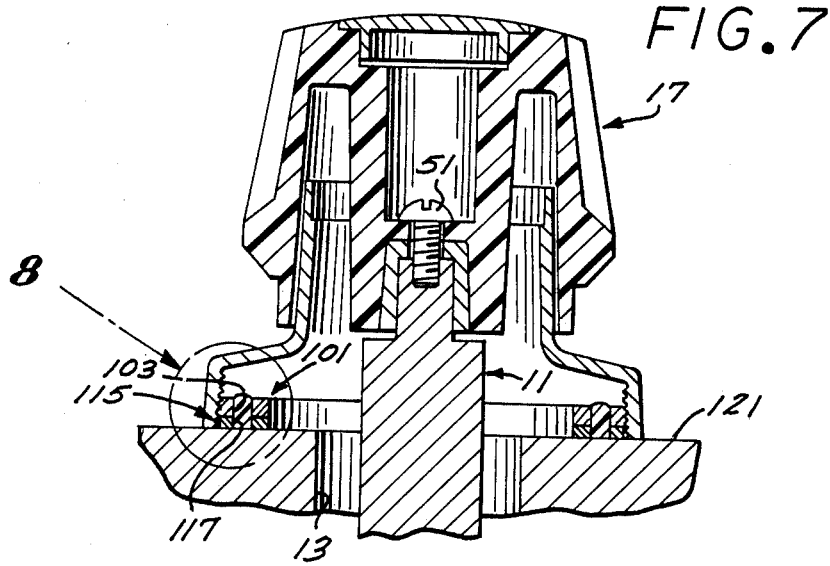
FIG. 7 is a sectional view, in enlarged scale, similar to FIG. 2, of the third embodiment, incorporating the rings shown in FIG. 5.
Figure 8:
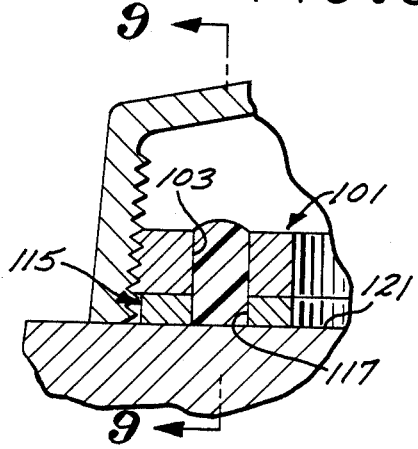
FIG. 8 is a detail view, in enlarged scale, taken from the circle designated 8 in FIG. 5.
Figure 9:
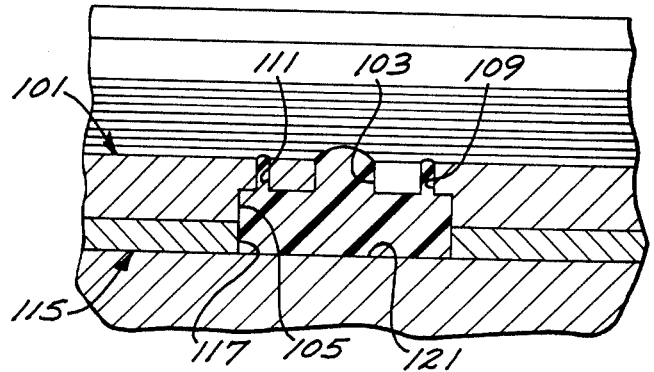
FIG. 9 is a sectional view, in enlarged scale, taken along the line 9—9 of FIG. 8.

For other applications where a valve stem 95 projects a greater distance from a wall 97, as shown in FIG. 4, the handle skirt 83 and escutcheon extension 41 will be left in position to thus cooperate in maintaining the longer valve stem 95 shrouded throughout travel of the handle axially with respect to the escutcheon 23. For other, intermediate applications, either the skirt 83 or extension 41 may be removed and discarded.

The embodiment shown in FIGS. 5-9 is similar to that shown in FIG. 1 except that the adapter ring 101 includes, spaced equidistance thereabout, a plurality of through filler bores 103 disposed centrally in blind circumferential slots defining blind cavities 105 which open toward the rear face of such ring. Formed on the opposite sides of such bores 103 are small vent bores log and 111 which communicate between such slots and the front face of the ring. A double faced adhesive attachment ring, generally designed 115, is attached to the back side of the adapter ring 101 and is formed with circumferentially elongated slots 117 complementing the shape the location of the blind slots 105.

The adapter and attachment rings 101 and 115 of FIGS. 5-9 may then be installed in a manner similar to that described hereinabove. Once the adapter ring 101 has been attached to the wall 121 by the adhesive attachment ring 115 to hold it in place, the bond between the adapter ring 101 and wall may be further enhanced by filling the slots defining the cavities 105 with a flowable bonding agent, such as Silicone Sealant, available from Dow Chemical or General Electric. This technique is easily achieved by inserting the nozzle of the bonding agent tube into the filler openings 103 (FIG. 8) and pressing the tube to eject the bonding agent from the nozzle. The bonding agent will thus fill the cavity defined by the slot 105, it being appreciated that any air trapped therein may vent through the vent bores 109 and 111. As the cavity 105 is completely filled, such bonding agent will fill the vent bores 109 and 111 to be visable to the workmen to signal that the cavity is full and that good contact has been made between the bonding agent in such cavity and the surface of the wall 121. This procedure will be repeated for each of the bonding cavities 105 and the agent then allowed to cure. It has been determined that once such bonding agent has cured, forces on the order of 25 to 50 pounds may be applied to the faucet handle without pulling it free from the wall.

In some circumstances the adapter ring 101 may be attached directly to the wall without the attachment ring 11 by manually holding it in place while a bonding agent having sufficient stickiness to hold it in position is inserted to fill the cavities 105.

From the foregoing, it will be apparent that the faucet repair kit of the present invention provides an economical and convenient means enabling relatively unskilled repairman to replace an existing valve stem with a valve stem of a different length or diameter and then install an escutcheon which will accommodate the new valve stem irrespective of the configuration of the original escutcheon or valve stem.

Various modifications and changes may be made with regard to the foregoing detailed description without departing from the spirit of the invention.

I claim:

1. A method of replacing a faulty faucet valve stem projecting from the body of a valve, through a wall opening with a new stem of different length of selecting and bonding an externally threaded adapter ring onto such wall by an adhesive bonding means and selecting an internally threaded escutcheon to be screwed thereonto, such method including the following steps:
   replacing such faulty stem with such new stem of such different length;
   selecting such adapter ring and telescoping it over said new valve stem;
   selecting such adhesive bonding means and applying it to such adapter ring to bond such ring to such wall; and
   selecting such escutcheon, fitting it over said new stem and screwing it onto said adapter ring.

2. A faucet escutcheon apparatus for attachment to a wall formed with an opening through which a valve stem projects and comprising:
   an adapter ring formed with a central bore sized to be telescopically received over said stem for mounting to said wall and formed with exterior screw thread means;
   an escutcheon formed with a cylindrical barrel for telescopical receipt over said stem and an enlarged-in-diameter base, said base being integrally threaded for being screwed onto said adapter ring; and
   adhesive bonding means for bonding said ring to a wall whereby said adapter ring may be fitted telescopically over said valve stem to be bonded to said all by said bonding mean and said escutcheon screwed thereonto.

3. A faucet repair apparatus as set forth in claim 2 for use with different length valve stems and wherein:
   said barrel of said escutcheon terminates in an end opposite said base formed with a cylindrical, open ended socket and said apparatus includes:
   a cylindrical extension tube having a body of substantially the same diameter as said barrel and formed with a reduced-in-diameter nipple configured to fit within said socket and to cooperate therewith in forming a friction fit whereby said extension tube may be removed from said escutcheon to accommodate different length valve stems.

4. A faucet repair apparatus as set forth in claim 3 that includes:
   a cylindrically shaped handle mounted centrally over the free end of said valve stem and formed on its end adjacent said stem with a cylindrical skirt and wherein said apparatus includes:
   a cylindrical shell defining a handle extension and formed with a socket to fit over said skirt, said socket being configured to cooperate with said skirt in forming a friction fit; and fastening means for removably fastening said handle to said stem.

5. A faucet repair apparatus as set forth in claim 3 for mounting on different stems formed with ends having predetermined different configurations and that includes:
   a handle formed centrally with an open ended spud cavity, having a predetermined polygonal shape; and
   a plurality of spuds having exterior cross-sectional configurations of said predetermined polygonal shape and sized to be press fit into said cavity, said spuds being formed with respective open ended bores, each formed with one of said predetermined configuration for fitting onto the respective stem ends.

6. A faucet repair apparatus as set forth in claim 2 wherein:
   said adapter ring is formed with a plurality of through filler openings spaced equidistant thereabout and said bonding means includes a flowable bonding agent to assist in bonding said ring to said wall.

7. A faucet repair apparatus as set forth in claim 5 wherein:
   said adapter ring is formed with a plurality of bonding cavities opening toward said back side of said adapter ring and in communication with said filler openings.

8. A faucet repair kit for shrouding a valve stem projecting from the body of a valve and through an opening in a wall and comprising:
   an adapter ring sized to telescopically fit over said stem for mounting from such wall and formed with external threads;
   attachment means secured on one side to said adapter ring and including adhesive bonding means for bonding said adapter ring to said wall; and
   a repair escutcheon formed with a barrel for telescoping over such valve stem and further formed with an internally threaded base for screwing onto said adapter ring to mount said ecutcheon from said ring whereby said adapter ring may be telescoped over said stem to surround said opening and be bonded to such wall by said bonding means for support therefrom and said base of said repair escutcheon screwed onto said adapter ring without attachment to such body of the valve.

9. a faucet repair kit according to claim 8 that includes:
   a cylindrical valve handle including a central mount for mounting on the end of such stem, said handle being formed with a handle barrel concentric with said mount and including an extension skirt formed with a socket configured to form a friction fit with said handle barrel and projecting longitudinally from said handle; and
   such escutcheon barrel is formed at its free end with a gland and said apparatus includes an escutcheon extension formed with an extension barrel configured to be received in and form a friction fit with said gland whereby said handle skirt and escutcheon extension may be selectively removed to accommodate valve stems having different lengths.

10. A faucet repair kit according to claim 8 wherein:
    said such valve stem is formed on its projecting extremity with a nib serrated about the periphery thereof and said apparatus includes:
    a handle formed centrally with a spud socket and a cup shaped spud received in said socket and configured to form a press fit therewith, said spud being formed interiorly with a serrated bore for complementally fitting over said nib.

11. A faucet repair apparatus as set forth in claim 8 wherein:
    said adapter and attachment rings are formed with a plurality of through filler openings spaced thereabout and said adhesive bonding means is in the form of a flowable bonding agent for receipt in said openings to bond said adapter ring to said wall.

12. A faucet repair apparatus as set forth in claim 11 wherein:
    said adapter and atachment rings are formed with circumferentially elongated cavities registered with said filler openings and opening toward said wall to increase the area of said bonding agent exposed to said wall.

13. A faucet repair apparatus as set forth in claim 12 wherein:
    said adapter ring is formed with vent holes disposed on the opposite sides of said filler openings and communicating from said cavities to said front face of said adapter ring.

14. A faucet escutcheon apparatus for attachment to a wall formed with an opening through which a valve stem projects, said apparatus comprising:
    an adapter ring formed with front and back sides, a central bore, and exterior screw thread means, said adapter ring further including through filler bores spaced equidistant thereabout;
    an escutcheon formed with a cylindrical barrel and an enlarged-in-diameter base, said base being internally threaded for screwing onto said adapter ring; and
    flowable adhesive bonding means for insertion in said filler bores to bond said ring to said wall, whereby said adapter ring may be fitted telescopically over said valve stem and said adhesive bonding means inserted in said filler bores to bond said ring to said wall and said escutcheon screwed thereto.

15. A faucet escutcheon apparatus comprising:
    an adapter ring formed with front and back sides, a central bore, and exterior screw thread means, said adapter ring further including filler cavities spaced equidistant thereabout and opening to said back side;
    flowable adhesive bonding means to be inserted in said cavities; and
    an escutcheon formed with a cylindrical barrel and an enlarged-in-diameter base, said base being internally threaded for mating with said thread means to be screwed onto said adapter ring, whereby said flowable adhesive bonding agent may be inserted in said cavities to bond said ring to said wall surrounding said stem to enable said escutcheon to be screwed thereonto.

* * * * *

UNITED STATES PATENT AND TRADEMARK OFFICE
CERTIFICATE OF CORRECTION

PATENT NO. : 4,739,788
DATED : April 26, 1988
INVENTOR(S) : Richard L. Reback

It is certified that error appears in the above-identified patent and that said Letters Patent is hereby corrected as shown below:

Column 5, line 30, delete "log" and insert --109--;

line 65, delete "11" and insert --115--;

Column 6, line 15, delete "of" (second occurence) and insert --by--.

Signed and Sealed this

Twentieth Day of December, 1988

Attest:

DONALD J. QUIGG

*Attesting Officer*     *Commissioner of Patents and Trademarks*